UNITED STATES PATENT OFFICE.

LUIS B. GANDIA CARRERAS, OF MOROVIS, PORTO RICO.

COFFEE-TABLET.

1,002,137. Specification of Letters Patent. Patented Aug. 29, 1911.

No Drawing. Application filed December 2, 1910. Serial No. 595,299.

*To all whom it may concern:*

Be it known that I, LUIS B. GANDIA CARRERAS, a citizen of the United States, residing at Morovis, in the Judicial District of Arecibo, Porto Rico, have invented certain new and useful Improvements in Coffee-Tablets; and I do hereby declare the following to be a full, clear, and exact description of the invention, such as will enable others skilled in the art to which it appertains to make and use the same.

My improved composition consists of the following ingredients, combined and in the proportions stated, viz: dry coffee extract, completely solid, 60 gm.; sugar of milk, 270 (450%) gm.; sodium bicarbonate, 3.60 (6%) gm.; citric acid, 2.40 (4%) gm.; gum arabic, 10 (16⅔) gm.

In manufacturing the above-mentioned composition, the sugar of milk, which is a sweetened powdered substance taken from the milk of a cow, and also known as lactose, and dry coffee extract, completely solid, are thoroughly mingled by trituration to reduce them to a fine, uniform powder. This powder must then be mixed with the gum arabic, sodium bicarbonate and citric acid, in order to obtain a fine and dry powder of sufficient quantity when the ingredients are used in the proportions stated to make twenty-eight tablets, each containing 12 grams, or any number of tablets suitable to make different sized cups of coffee, 12 grams, however, being considered the proper number for obtaining the best results.

In using one of these tablets, a cup of milk or water should be heated, and the tablet then applied with a little quantity of sugar obtained from sugar cane or the like either loaf sugar, refined sugar, moscalado, etc. to sweeten the same to suit the taste.

Having thus fully described this invention, what I claim as new and desire to secure by Letters Patent is:

1. The herein-described composition of matter, consisting of dry coffee extract, sugar of milk, sodium bicarbonate, citric acid, and gum arabic, substantially as and for the purposes described.

2. The herein-described composition of matter for making coffee rapidly, consisting of dry coffee extract, completely solid, 60 gm.; sugar of milk, 270 gm.; sodium bicarbonate, 3.60 gm.; citric acid, 2.40 gm.; gum arabic, 10 gm., the same to be mixed substantially as and for the purposes hereinbefore described.

In testimony whereof I affix my signature in presence of two witnesses.

LUIS B. GANDIA CARRERAS.

Witnesses:
PEDRO RIVERA,
IGNACIO RODRIGUEZ.